April 18, 1944. W. R. PERRY 2,346,868
FLUID CONTROL FOR SPEED VARYING TRANSMISSION
Filed Jan. 17, 1938 2 Sheets-Sheet 1
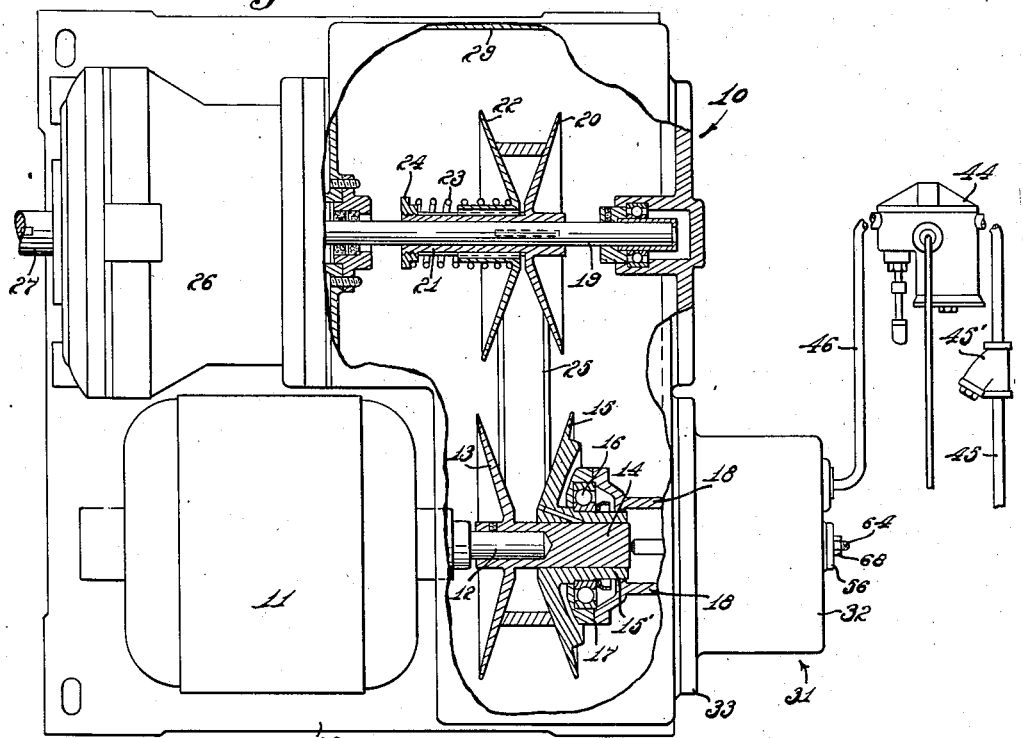
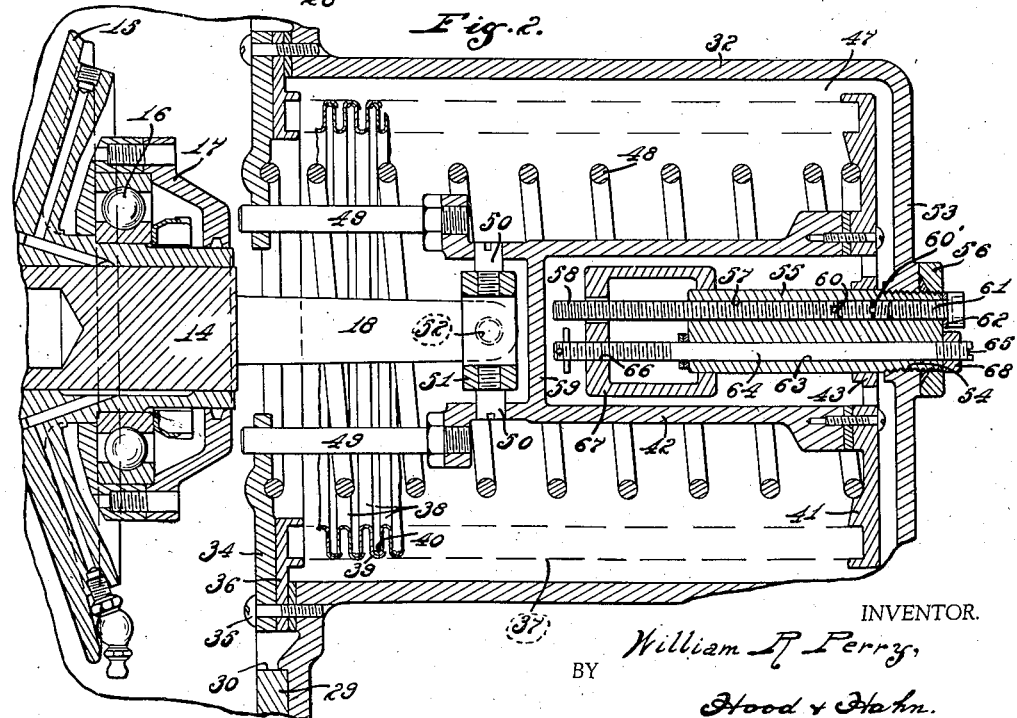
INVENTOR.
William R. Perry,
BY
Hood & Hahn.
ATTORNEYS.

April 18, 1944.    W. R. PERRY    2,346,868
FLUID CONTROL FOR SPEED VARYING TRANSMISSION
Filed Jan. 17, 1938    2 Sheets-Sheet 2

INVENTOR.
William R. Perry,
BY Hood & Hahn
ATTORNEYS.

Patented Apr. 18, 1944

2,346,868

UNITED STATES PATENT OFFICE 2,346,868

FLUID CONTROL FOR SPEED VARYING TRANSMISSIONS

William R. Perry, Columbus, Ind., assignor to Reeves Pulley Company, Columbus, Ind., a corporation of Indiana Application January 17, 1938, Serial No. 185,367

20 Claims. (Cl. 74—230.17)

The present application relates to a hydraulic control for variable speed transmissions of the coned disc V pulley type; and the primary object of the invention is to provide a satisfactory and reasonably accurate hydraulic control for a device of that character.

A further object is the provision of means, accessible at all times from outside the pressure chamber, for adjusting the range of the hydraulic operating mechanism. More particularly, it is an object of the present invention to provide separate stop means for limiting the throw, respectively in opposite directions, of an element shiftable in response to variations in fluid pressure and/or volume; such stop means being independently adjustable at all times regardless of the pressure and/or volume conditions within the control chamber. Further objects of the invention appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a plan view, partly in section, of a transmission of the character here under consideration, to which has been applied one form of fluid control constructed in accordance with the present invention;

Fig. 2 is an enlarged sectional view of the control per se;

Figure 3:
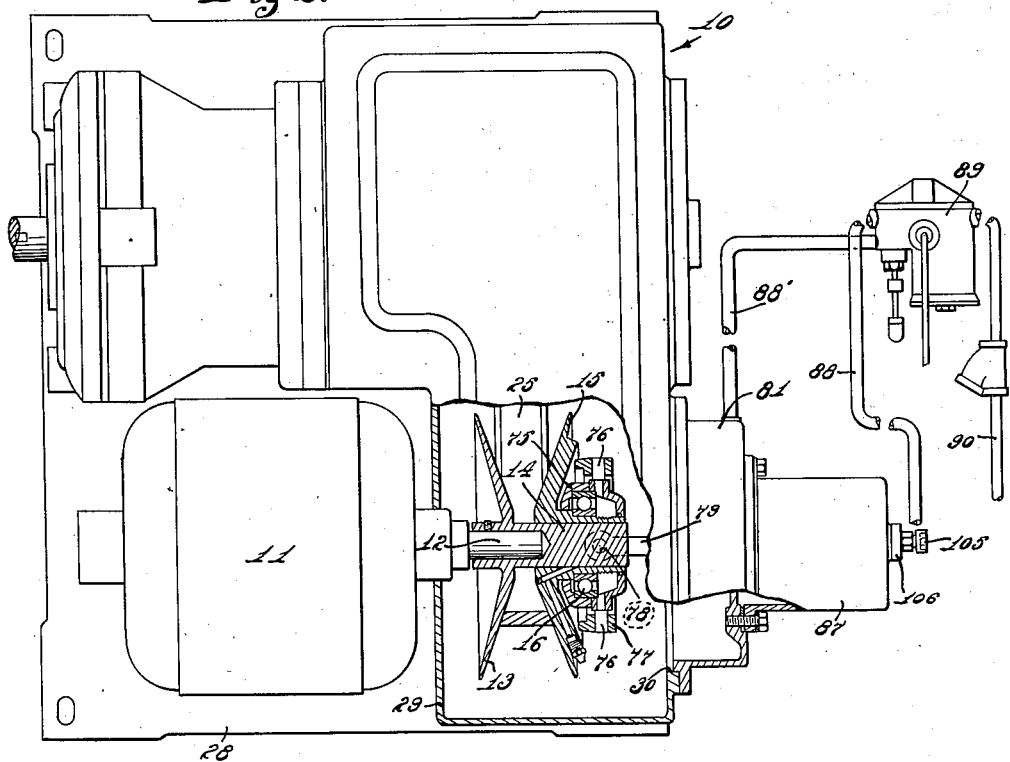
Fig. 3 is a view similar to Fig. 1, but showing a different form of control constructed in accordance with the present invention.

Referring more particularly to Figs. 1 and 2, it will be seen that I have illustrated a variable speed transmission unit indicated generally by the reference numeral 10. Upon a suitable base 28, there is mounted a motor 11, having a spindle 12 to which is fixed a coned disc 13 provided with an elongated hub 14 projecting from its coned face. Upon the hub 14 is slidably but non-rotatably mounted a mating coned disc 15 having a hub 15' upon which is mounted a bearing 16 enclosed within a bearing housing 17. The bearing housing 17 is provided with a pair of longitudinally projecting spaced arms 18 for a purpose which will later be explained.

Upon the base 28 is likewise supported a casing 29 in which is journalled a shaft 19 to which is fixed a coned disc 20 having an elongated hub 21 upon which is slidably but non-rotatably mounted a mating coned disc 22. A coiled spring 23 bears at one end against the disc 22 and at its other end against a stop collar 24 secured to the extremity of the hub 21, whereby said spring constantly urges the disc 22 toward its fellow 20.

A V belt 25 provides a driving connection between the pulley 13, 15 and the pulley 20, 22.

The shaft 19, in the illustrated embodiment of the invention, drives the input shaft of a speed reducing gear train 26 which is likewise supported upon the base 28, and the output shaft of which is indicated at 27.

The housing 29 is formed with an aperture 30 which is preferably coaxial with the spindle 12. The control, indicated generally by the reference numeral 31, comprises a cup 32 formed with a circumferential flange 33 at its open end, said flange 33 being secured to the casing 29 in such a position that the cup 32 closes the aperture 30.

To the open end of the cup 32 is secured a ring 34 through the medium of bolts 35, or the like; and clamped between said ring 34 and the open end of the cup 32 is a ring or washer 36 to which is anchored one end of a bellows 37. Said bellows 37 is preferably of the particular construction illustrated, being compounded of a plurality of helical turns 38 of a metallic strip, each of which is formed with one cupped leg 39 received in the adjacent cupped leg 40 of the next adjacent turn; the adjacent legs of the respective turns being hermetically connected preferably by means of silver solder or the like. This particular type of bellows is preferably used in the present organization because of the fact that the demands placed upon the bellows of the present organization exceed the satisfactory capacity of bellows drawn from flat sheets.

The opposite end of the bellows 37 is closed by a cover 41 which carries an axially projecting well 42 and a central annulus or collar 43. It will be seen that the outer surface of the bellows 37, together with the cover 41 and the well 42, cooperate with the inner surface of the cup 32 to form a hermetically sealed, variable-volume chamber 47.

More or less diagrammatically, I have illustrated in Fig. 1 a source of fluid under pressure comprising a pipe 45 leading from a tank or compressor through a strainer 45' to a valve mechanism 44 which controls the application of fluid pressure through the pipe 46 to the chamber 47. The details of the means for supplying fluid to the chamber 47 form no part of the present invention.

A spring 48 is positioned within the region defined by the inner surface of the bellows 37 and bears at one end against the cover 41 and at its other end against the ring 34, said spring tending constantly to urge the cover 41, which forms a movable wall of the variable volume chamber 47, toward the end wall 53 of the cup 32, thereby tending to contact the variable volume chamber. A pair of pins 49, carried by the well 42, and passing through holes in the ring 34, resist any torque which may be transmitted through the arms 18 to a ring 51 supported, by diametrically oppositely projecting pins 50, upon the well 42. Said arms 18 are, as is clearly illustrated, connected to oppositely projecting pins 52 carried by the ring 51, the common axis of said pins 52 being substantially perpendicular to the common axis of the pins 50.

The end wall 53 of the cup 32 is formed with a substantially central aperture 54 in which is threadedly received a guide member 55, said guide member being held in position by a jam nut 56.

Said guide member is formed with a longitudinally-extending interiorly-threaded bore 57 in which is adjustably mounted a screw 58 which, at one end, projects beyond the end of the guide member and into cooperative relation to the bottom wall 59 of the well 42; and which, at its other end, is formed with a kerf 60. The other end of the bore 57 is closed by a threaded plug 61; and a jam screw 60' is provided to hold screw 58 against accidental movement.

It will be obvious that, since the guide member 55 is stationarily mounted in the end wall 53 of the cup 32, movement of the cover 41 toward the right, as viewed in Fig. 2, will be limited by contact of the bottom wall 59 of the well 42 with the projecting end of the screw 58; and that the position at which the said cover 41 will be stopped will depend upon the adjusted position of the screw 58. Obviously, the screw 58 may be adjusted, regardless of the pressure conditions within the chamber 47, by removing the plug 61 and inserting a screw driver into the bore 57 to engage the kerf 60. Preferably, a gasket 62 is positioned between the head of the plug 61 and the ends of the guide member 55.

The guide member 55 is formed with a second longitudinally extending bore 63 which is unthreaded and in which is mounted a screw 64. Said screw 64 is rotatably but non-reciprocably mounted within said bore and, at its right-hand end which projects outside the guide member 55, is formed with a kerf 65. The left-hand end of the screw 64 is threadedly engaged with a threaded bore 66 in a stop member 67 which is slidably supported upon the guide member 55. Obviously, the position of the stop member 67 will determine the limit of movement of the cover 41 toward the left, as viewed in Fig. 2, by engagement of the collar 42 with said stop member 67. Regardless of pressure conditions within the chamber 47, the position of the stop member 67 may be adjusted by rotation of the screw 64 which can be engaged by a screw-driver outside the cup 32. The screw 64 may be locked in position by means of a jam nut 68.

Figure 4:
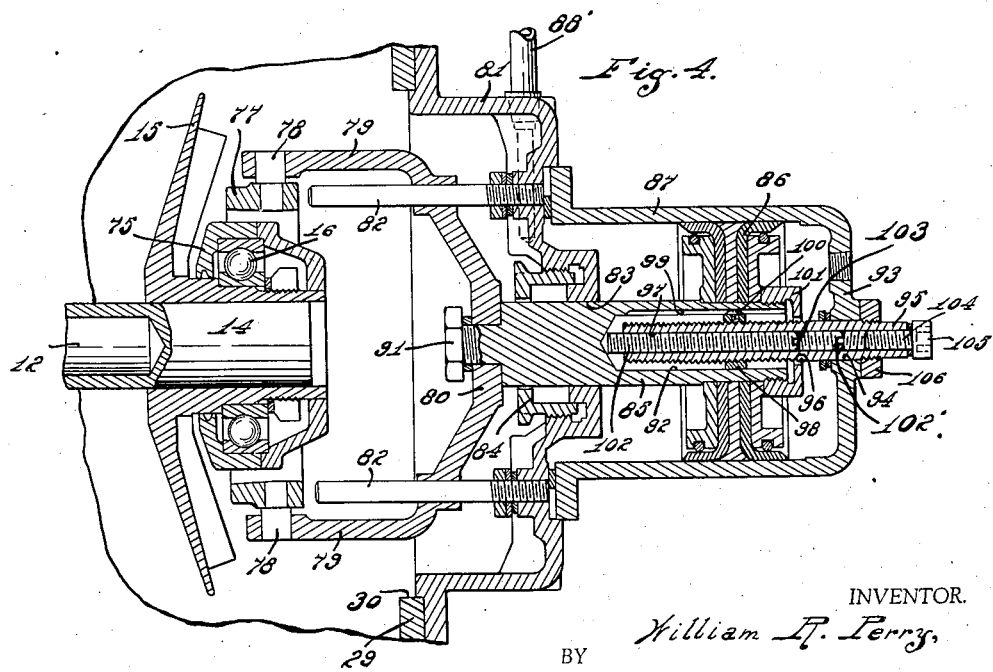
Fig. 4 is an enlarged sectional view of the control of Fig. 3.

Referring, now, to Figs. 3 and 4, it will be seen that I have illustrated the same transmission, indicated generally by the reference numeral 10, and comprising the motor 11 with its spindle 12 upon which is mounted the expansible pulley comprising the coned disc 13 with its hub 14 upon which is slidably mounted the disc 15 carrying the bearing 16. A slightly different form of bearing housing 75 is illustrated in this embodiment of the invention, said bearing housing carrying diametrically oppositely projecting pins 76 upon which is mounted an equalizer ring 77 which carries diametrically oppositely projecting pins 78, the common axis of which is substantially perpendicular to the common axis of the pins 67. The arms 79 of a yoke member 80 are respectively connected to the pins 78.

In this form of the invention, the casing aperture 30 is closed by a cup 81 which carries a pair of parallel pins 82 upon which the yoke 80 is supported against rotation. Said cup 81 is formed to provide a bearing 83 and stuffing box 84 in which is reciprocably mounted a piston rod 85 carrying a piston 86 operatively received within a cylinder 87 secured to the cup 81. Fluid under pressure is supplied through the mechanism illustrated more or less diagrammatically in Fig. 3 and comprising two pipes 88 and 88', the flow of fluid through said pipes being controlled by a valve mechanism 89 to which fluid is supplied from a suitable source through the pipe 90.

The yoke 80 is secured to the piston rod 85 by a nut 91, or the like. The end of the piston rod 85 which is positioned within the cylinder 87 is formed with an axially extending socket 92. The end wall 93 of the cylinder 87 is formed with an aperture 94 in which is rotatably but non-reciprocably mounted a tube 95 provided with external threads 96 and internal threads 97. A nut 98 is threadedly mounted upon the external threads 96 of said tube 95, and is provided with a projection 100 (which, in the illustrated embodiment of the invention, comprises a screw head) slidably mounted in a groove 99 in the socket 92, whereby rotation of the nut 98 is prevented. A collar 101 is carried by the piston rod 85 and operates not only to hold the piston 86 in position, but also as a stop element cooperative with the nut 98 to limit movement of the piston 86 toward the left, as viewed in Fig. 4. Obviously, the position of the nut 98 will control the point at which the piston 86 is stopped; and that position may be adjusted by turning the tube 95. Normally, said tube 95 is held against rotation through the medium of a jam nut 106; but, when said nut is loosened, a wrench may be applied to the polygonal portion of the tube 95 which projects outside the cylinder, to rotate said tube to adjust the position of the nut 98.

A screw 102 is threadedly mounted within the bore of the tube 95; and at its outer end is provided with a kerf 103 for engagement by a screw-driver. A jam screw 102' is provided to hold the screw 102 against accidental movement. The outer end of the bore of the tube 95 is closed by a threaded plug 104 having a polygonal head 105. Movement of the piston 86 toward the right, as viewed in Fig. 4, is limited by engagement of the screw 102 with the bottom of the socket 92.

I claim as my invention:

1. The combination with a shiftable element, of means for shifting said element comprising a chamber having a movable wall and an immovable wall, means connecting said movable wall with said element, means for introducing fluid under pressure into said chamber to bear against said movable wall to move the same, and stop means for limiting the movement of said wall in response to the introduction of such fluid, said stop means being carried by said immovable wall, having portions located within said chamber, and being adjustable from without said chamber.

2. The combination with a shiftable element, of means for shifting said element comprising a chamber having a movable wall, means connecting said movable wall with said element, means for applying fluid pressure to said movable wall to move the same, and stop means for limiting the movement of said wall, said stop means comprising a guide member carried by a stationary wall of said chamber and projecting into said chamber, said movable wall being provided with an element snugly and slidably embracing and guided upon said guide member, a screw adjustably threadedly engaged in a bore in said guide member and projecting therefrom into cooperative relation with a portion of said movable wall to limit adjustably the movement of said wall toward said screw, a stop member slidably guided upon said guide member, a second screw non-reciprocably but rotatably mounted in a second bore in said guide member and threadedly engaging said stop member and operable to shift said stop member axially of said guide member, said stop member being cooperable with said wall element guided upon said guide member to limit adjustably the movement of said wall away from said first-mentioned screw.

3. The combination with a shiftable element, of means for shifting said element comprising a chamber having a movable wall and an immovable wall, means connecting said movable wall with said element, means for applying fluid pressure to said movable wall to move the same, and stop means for limiting the movement of said movable wall, said stop means comprising two elements supported from said immovable wall, having portions positioned within said chamber and adapted to be respectively engaged by means carried by said movable wall upon movement of said movable wall in opposite directions, and independent screw means independently operable from without said chamber to shift said two elements respectively.

4. The combination with an element, of means for shifting said shiftable element comprising a cup stationarily mounted adjacent said shiftable element, a bellows associated with said cup and cooperating therewith to form a variable-volume chamber, means connecting the movable end of said bellows to shift said shiftable element, means for applying fluid pressure to the interior of said chamber, and stop means located within said cup for limiting the throw of said bellows in opposite directions, and means accessible from a substantially common point without said cup for adjusting position of said stop means.

5. The combination with a rotatable and axially shiftable element, of a casing enclosing said element and formed with an aperture adjacent said shiftable element, a cup, means for securing the open end of said cup to said casing in position to close said aperture, a bellows positioned within said cup and having one end anchored adjacent the open end of said cup, said bellows co-operating with said cup to form a closed, variable-volume chamber, means for applying fluid pressure to the interior of said chamber, means operatively connecting the movable end of said bellows to shift said shiftable element and means positively holding said last-named means against rotation about the axis of said element.

6. The combination with a variable speed transmission including an element axially shiftable to vary the speed ratio of the transmission, of a casing enclosing said transmission and formed with an aperture adjacent said shiftable element, a cup, means for securing the open end of said cup to said casing in position to close said aperture, a bellows having an open end anchored within the open end of said cup, the outer surface of said bellows and the inner surface of said cup cooperating to define an annular chamber, a cover carried by the opposite end of said bellows and closing said chamber, said cover being provided with an axially-extending well projecting into the space defined by the inner surface of said bellows, a spring tending to expand said bellows, means for applying fluid pressure to the interior of said chamber, means operatively connecting said cover to shift said shiftable element, and stop means disposed within said well and accessible for adjustment from outside said cup for limiting the movement of said cover.

7. The combination with a shiftable element, of means for shifting said element comprising a closed cylinder, means for supplying fluid under pressure alternatively to opposite ends of said cylinder, a piston within said cylinder, means operatively connecting said piston to shift said shiftable element, and stop means within said cylinder and operable to limit the throw of said piston in opposite directions, said stop means being adjustable from outside said cylinder at one end only thereof.

8. The combination with a shiftable element, of means for shifting said element comprising a closed cylinder, means for supplying fluid under pressure alternatively to opposite ends of said cylinder, a piston within said cylinder, means operatively connecting said piston to shift said shiftable element, and stop means within said cylinder and operable to limit the throw of said piston in opposite directions, said stop means comprising a tube rotatably but non-reciprocably mounted in an end wall of said cylinder and projecting into said cylinder, said tube being provided with internal and external threads, a screw threadedly received within the bore of said tube and projecting therefrom into cooperative stopping relation with said piston, and a nut threadedly mounted on the external threads of said tube, in cooperative stopping relation with said piston, and means for holding said nut against rotation.

9. The combination with a shiftable element, of means for shifting said element comprising a closed cylinder, means for supplying fluid under pressure alternatively to opposite ends of said cylinder, a piston within said cylinder, means operatively connecting said piston to shift said shiftable element, and stop means within said cylinder and operable to limit the throw of said piston in opposite directions, said stop means comprising an externally threaded element rotatably but non-reciprocably mounted in an end wall of said cylinder and projecting coaxially thereinto, a nut mounted on said element within said cylinder in cooperative stopping relation to said piston, and means for holding said nut against rotation, said element being manipulable from outside said cylinder.

10. The combination with a shiftable element, of means for shifting said element comprising a closed cylinder, means for supplying fluid under pressure alternatively to opposite ends of said cylinder, a piston within said cylinder, means operatively connecting said piston to shift said shiftable element, an axial socket formed in said piston, and stop means for said piston comprising an externally threaded element rotatably but non-reciprocably mounted in an end wall of said cylinder and projecting into said socket, a nut threadedly mounted on said element and held against rotation, and means carried by said piston and engageable with said nut, at times, to stop movement of said piston in one direction.

11. The combination with a shiftable element, of means for shifting said element comprising a closed cylinder, means for supplying fluid under pressure alternatively to opposite ends of said cylinder, a piston within said cylinder, means operatively connecting said piston to shift said shiftable element, an axial socket formed in said piston, and stop means for said piston comprising a tube rotatably but non-reciprocably mounted in an end wall of said cylinder and projecting into said socket, said tube being provided with internal and external threads, a screw threadedly received within the bore of said tube and projecting therefrom into cooperative stopping relation with the bottom of said socket, and a nut threadedly mounted on the external threads of said tube within said socket and held against rotation, and means carried by said piston and engageable with said nut, at times, to stop movement of said piston.

12. The combination with a shiftable element, of means for shifting said element comprising a chamber having a movable wall and an immovable wall, means connecting said movable wall with said element, means for applying fluid pressure to said movable wall to move the same, and two independently adjustable elements for respectively limiting the movement of said wall in opposite directions, said elements being supported from said immovable wall, having portions located within said chamber and being adjustable from without said chamber.

13. The combination with a variable speed transmission of the expansible cone-disc-pulley type including a disc axially shiftable to vary the ratio of said transmission, of a casing enclosing said transmission and formed with an aperture adjacent said disc of a diameter at least slightly greater than the diameter of said disc, a cup exteriorly secured to said casing with its open end in communication with said aperture, a bellows substantially received within said cup and cooperating therewith to form a variable-volume chamber, means connecting the movable end of said bellows to shift said disc, and means for controllably applying fluid pressure to the interior of said chamber.

14. The combination with a variable speed transmission of the expansible cone-disc-pulley type including a disc axially shiftable to vary the ratio of said transmission, of a casing enclosing said transmission and formed with an aperture adjacent said disc of a diameter at least slightly greater than the diameter of said disc, a cup exteriorly secured to said casing with its open end in communication with said aperture, a bellows substantially received within said cup and cooperating therewith to form a variable-volume chamber, means connecting the movable end of said bellows to shift said disc, means for controllably applying fluid pressure to the interior of said chamber, stop means located within said cup for limiting the throw of said bellows in opposite directions, and means accessible from without said cup for adjusting the position of said stop means.

15. The combination with a variable speed transmission of the expansible cone-disc-pulley type including a disc axially shiftable to vary the ratio of said transmission of a casing enclosing said transmission and formed with an aperture adjacent said disc of a diameter at least slightly greater than the diameter of said disc, a cup exteriorly secured to said casing with its open end in communication with said aperture, a bellows substantially received within said cup, the exterior surface of said bellows and the interior surface of said cup cooperating to form a variable-volume chamber, means connecting the movable end of said bellows to shift said disc, a spring located within said bellows and urging the movable end thereof toward the corresponding end of said cup, and means for controllably applying fluid pressure to the interior of said chamber.

16. The combination with a variable speed transmission comprising a pair of shafts, a coned disc fixed to one of said shafts, a coned disc fixed to the other of said shafts and offset and oppositely facing with respect to said first-mentioned disc, a coned disc slidably mounted on each of said shafts, said slidable discs respectively cooperating with said fixed discs to form expansible V-pulleys, an edge-active belt providing a driving connection between said pulleys, and means resiliently urging one of said slidable discs toward its mate, of fluid-operated means for shifting the other of said slidable discs, comprising a thrust bearing operatively associated with said last-mentioned shiftable disc, a cylinder, a piston reciprocable in said cylinder, means for controllably alternatively applying fluid pressure to opposite ends of said cylinder, and means connecting said piston to said last-mentioned shiftable disc, said last-named means including an element interposed between said piston and said disc and pivotally associated therewith upon perpendicular axes lying in a common plane.

17. The combination with a variable speed transmission comprising a pair of shafts, a coned disc fixed to one of said shafts, a coned disc fixed to the other of said shafts and offset and oppositely facing with respect to said first-mentioned disc, a coned disc slidably mounted on each of said shafts, said slidable discs respectively cooperating with said fixed discs to form expansible V-pulleys, an edge-active belt providing a driving connection between said pulleys, and means resiliently urging one of said slidable discs toward its mate, of fluid-operated means for shifting the other of said slidable discs, comprising a bellows having a fixed end and a movable end, means for controllably applying fluid pressure to said bellows to shift the movable end thereof, and means connecting said movable end to said last-mentioned shiftable disc, said last-named means including an element interposed between said bellows end and said disc and pivotally associated therewith upon perpendicular axes lying in a common plane.

18. In a device of the class described, a shiftable element and fluid-operated means for shifting said element comprising a cup, a bellows substantially received within said cup, a ring hermetically secured to one open end of said bellows and to the open end of said cup, and a plate hermetically secured to the opposite open end of said bellows and closing the same, whereby said bellows, ring, plate, and cup cooperate to form a closed, variable-volume chamber between the external surfaces of said bellows and plate and the internal surfaces of said ring and cup, and means at least partially received within said bellows and secured to the inner surface only of said plate and providing an operating connection between the internal surface of said plate and said shiftable element.

19. A variable-volume chamber for use as a reciprocating fluid-pressure motor, comprising a cup, a bellows having an annulus soldered to each end thereof, and closure elements secured to each of said annuli by screws, a gasket being interposed between each of said annuli and its associated closure element.

20. The combination with a shiftable element, of means for shifting said element comprising a cup stationarily mounted adjacent said shiftable element, a bellows associated with said cup and cooperating therewith to form a variable-volume chamber, means connecting the movable end of said bellows to shift said shiftable element, means for applying fluid pressure to the interior of said chamber, and stop means located within said chamber for limiting the throw of said bellows in opposite directions, and means accessible from a substantially common point without said cup for adjusting the position of said stop means.

WILLIAM R. PERRY.